No. 669,653. Patented Mar. 12, 1901.
W. W. MORSE.
MEANS FOR ATTACHING MOTORS TO VEHICLES.
(Application filed Oct. 16, 1900.)
(No Model.)
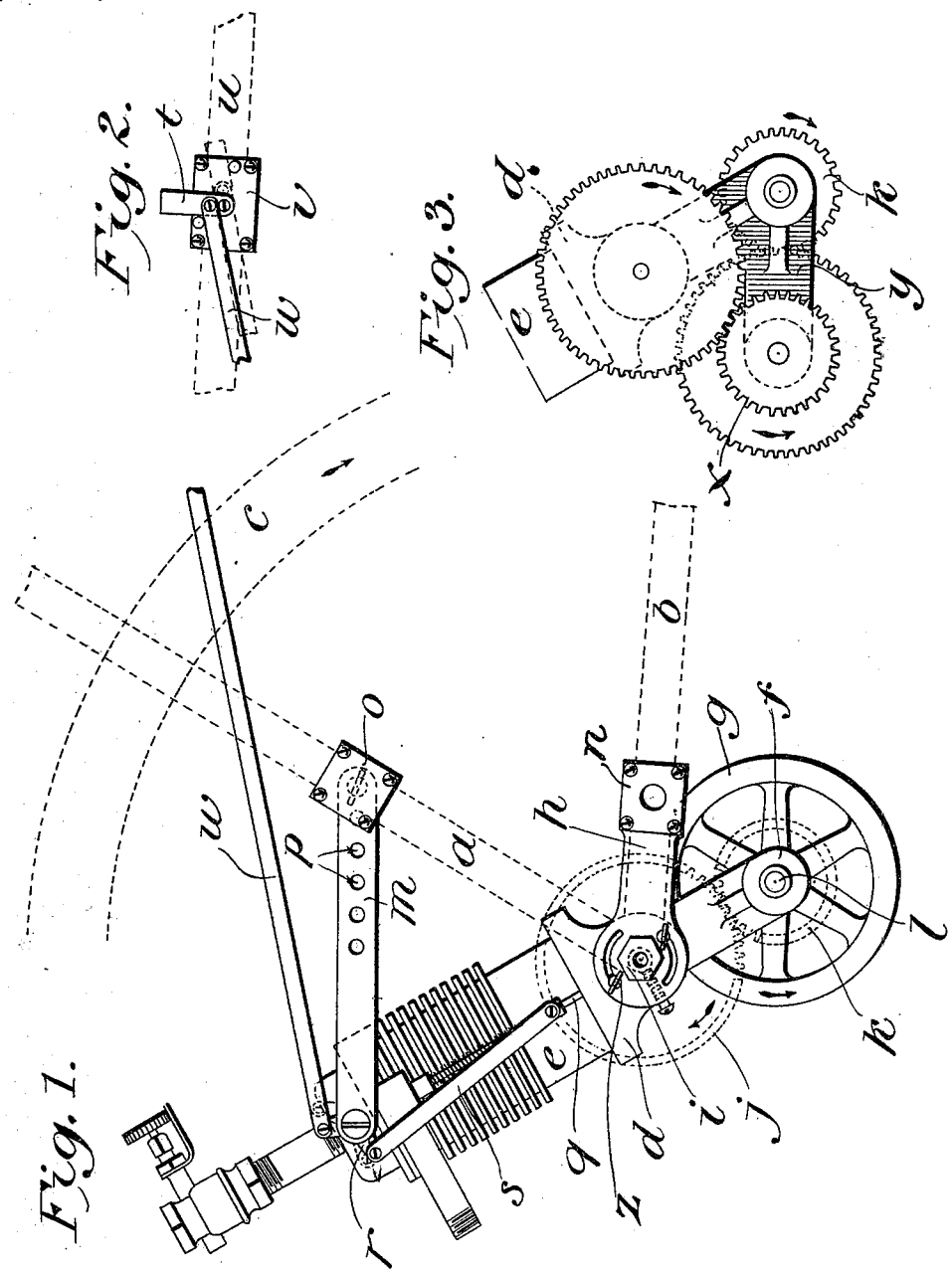
WITNESSES:
Robt. S. Allyn.
L. Vreeland
INVENTOR
William W. Morse.
BY
G. T. Hackley.
ATTORNEY
THE NORRIS PETERS CO., PHOTO-LITHO., WASHINGTON, D. C.

UNITED STATES PATENT OFFICE.

WILLIAM W. MORSE, OF WEST ORANGE, NEW JERSEY.

MEANS FOR ATTACHING MOTORS TO VEHICLES.

SPECIFICATION forming part of Letters Patent No. 669,653, dated March 12, 1901.

Application filed October 16, 1900. Serial No. 33,237. (No model.)

*To all whom it may concern:*

Be it known that I, WILLIAM W. MORSE, a citizen of the United States, residing at West Orange, Essex county, New Jersey, have invented certain new and useful Improvements in Means for Attaching Motors to Vehicles, of which the following is a full, clear, and exact description.

My invention relates to automobiles, and particularly to means for detachably securing the motor to the vehicle.

The main object of my invention is to provide means whereby the motor by which the vehicle is driven may be quickly and easily attached to or detached from the frame of a vehicle, the working position being such that the motor may be moved around its support to any desired position without disturbing the operative connection between the power-transmitting devices.

The device is particularly applicable to bicycles, tricycles, and the like, and its means of attachment is such that the engine and the attaching means may be manufactured and sold independently. Consequently any owner of such a vehicle can at nominal expense purchase the motor and attaching device and apply them to his own wheel irrespective of its make.

In the drawings, Figure 1 is a side elevation of a motor and the means whereby the same may be attached to a bicycle, the rear portion of the bicycle-frame being shown in dotted outline to indicate merely the position of the same. Fig. 2 is a side elevation of a detail of construction, and Fig. 3 is a view of a modification of the gear arrangement.

In the drawings, $a$ $b$ are the tubes at the rear portion of a diamond frame, such as is commonly used in bicycles and the like. These tubes $a$ and $b$ meet at their rearward extremities in a frame which commonly supports the axle for the driving-wheel $c$ of a bicycle. Upon this shaft is ordinarily supported a step, too well known to require illustration, which is ordinarily a tube screw-threaded at one end to act as a nut. The connecting means is such that the motor may be attached to either side of the machine; but the drawing is shown from the left-hand side of the machine.

$d$ is a frame carrying the motor-cylinder $e$ and the parts associated therewith at one end and a bearing $f$ for a fly-wheel $g$ at the opposite end, the fly-wheel being connected with the piston (not shown) in the cylinder $e$ in the usual manner.

$h$ is a bracket pivotally adjustable with respect to the frame $d$.

$i$ is an attaching member, preferably screw-threaded and which carries the bracket $h$, which is adapted to be screwed upon one end of the axle for the driving-wheel of a bicycle. The center of the attaching device $i$ is concentric with the pivotal connection between the frame $d$ and the bracket $h$.

$z$ is a fastening device adjustable in a slot concentric with $i$ in the bracket $h$, adaptable for securing the bracket in the frame $d$.

$j$ is a gear-wheel, (illustrated in dotted outline,) which gear-wheel is secured to the hub of the wheel $c$. This is the only addition to the bicycle that is needed in order to adapt it to receive the motor-attaching means and to enable the motor to be operatively connected with the propelling device, and this addition is very easily effected by any ordinary mechanic.

$k$ is a gear-wheel carried by the driving-shaft $l$, upon which the fly-wheel $g$ is mounted. This gear-wheel $k$ is in mesh either directly or indirectly with the gear $j$. The bracket $h$ is secured at one end to the frame of the bicycle by the attaching device $i$, previously referred to, while at its outer end it may be provided with a suitable clutch or fastening device $n$, which may be fastened to the tube $b$.

$m$ is a link attached to the motor at a point sufficiently remote from the connection $i$ to permit the same to be used effectively as a positioning-bracket whereby the angle of the motor may be varied. This link may be secured by means of any suitable fastening device $o$ to the rear fork of the bicycle-frame, and the link $m$ may have an elongated perforation or number of holes $p$, whereby it may be adjustably secured to the fork $a$ at any desired position.

$q$ is a rod attached to the engine-valve—for example, the exhaust-valve—whereby the same is controlled automatically in any well-known manner.

$r$ is a bell-crank lever pivoted concentrically between the link $m$ and the engine.

*s* is a connecting-rod between one arm of the lever *r* and the valve-rod *q*.

*t* is a lever adjustably mounted upon the top bar *u* of the bicycle-frame by means of a bracket *v*.

*w* is a connecting-rod between the bell-crank lever *r* and the lever *t*.

The great advantage of the means for attaching the motor to the bicycle heretofore described is that the motor may be attached to any bicycle by any ordinary user, and no matter what is its angular position with respect to the frame of the bicycle the power-transmitting gears will always be in proper relation to each other. In Fig. 1 the engine is shown inclined at an angle considerably out of the vertical; but by simply loosening the connection between the frame *d* and the bracket *h* and by taking up on the link *m* the angle may be readily changed. It is not always necessary to use the rod M, and under such circumstances the motor may be given sufficient stability by the other means. The lever *t* is employed to manually control the valve-rod *q*. If this rod operate the exhaust-valves, the same may be opened so as to prevent the compression in the event the engine is a gas-engine, such as indicated by the drawings. Without compression the ignition will be accompanied by little if any propelling power. By making the lever *r* adjustable the same coöperates with the other brackets in such manner that the angle of inclination of the engine may be varied as desired, the controlling-lever *t* being always within reach of the rider. This engine is attached, preferably, to a bicycle provided with what is commonly known as a "coaster-brake," a device which enables the rider while riding to automatically release the cranks from operation, thus allowing the vehicle to proceed under its own inertia or under the propelling power of the attached motor, the rider's feet resting at ease upon the pedals. The pedals may be employed in starting the engine, after which they may be brought to rest and utilized in controlling the brake in the well-known manner to slow down the speed of the machine. Inasmuch as the construction of the engine forms no part of this invention the same has not been shown or described in detail.

The gears instead of being formed of metal may be of any suitable composition—for example, fibroid, rawhide, other noiseless material, or the like.

If it is desired to cut down the propelling speed of the motor, the same may be effectively done in a simple manner by inserting a speed-reducing pinion *x* between the gears *k* and *j*. This pinion *x* may be carried by a suitable extension *y* on the frame *d*.

What I claim is—

1. In a motor-attaching device for vehicles, in combination, a bracket attached to the frame of the vehicle at a point other than the axis of the driving-wheel, a motor attached to said bracket at a point concentric with the axis of said driving-wheel and secured to said bracket said motor being pivotally adjustable with respect to said bracket by means adjustable in slots concentric with the said axis.

2. In a motor-attaching device for vehicles, in combination, a motor, a bracket, means for attaching said bracket to a vehicle said bracket being slotted on an arc concentric with the axis of the driving-wheel, and means on said motor coacting with the slotted portion of said bracket for securing said motor to said bracket.

3. In a motor-attaching device for vehicles, in combination, a motor, a bracket, means for attaching said bracket to a vehicle said bracket having segmental slots formed in an arc concentric with the axis of the driving-wheel, and means on said motor coacting with the slotted portion of said bracket for securing said motor to said bracket.

4. In a motor-attaching device for vehicles, in combination, a motor, a bracket, means for attaching said bracket to a vehicle said bracket having slots formed in an arc concentric with the axis of the driving-wheel, and bolts coacting with the slotted portion of said bracket for securing said motor to said bracket.

5. In a motor-attaching device for vehicles in combination, a motor, a bracket, an attaching device supporting said bracket said attaching device being screw-threaded and adapted to engage the threaded axle of the vehicle.

6. In a motor-attaching device for vehicles in combination, a motor, a bracket, an attaching device supporting said bracket said attaching device being screw-threaded and adapted to engage the threaded axle of the vehicle, said bracket being revolubly mounted upon said attaching device.

7. In a motor-attaching device for vehicles in combination, a motor, a bracket, an attaching device supporting said bracket said attaching device being screw-threaded and adapted to engage the threaded axle of the vehicle, said bracket being revolubly mounted upon said attaching device, and means to adjustably secure said bracket to said attaching device.

8. In a device of the character described in combination, a motor, a vehicle, a valve-rod on said motor, a bell-crank lever pivoted on said motor, a link connecting said bell-crank lever and said valve-rod, a connecting-rod secured at one end to said bell-crank lever and at the other end to an operating-lever mounted upon the frame of a vehicle and slidably adjustable thereon to accommodate the angular position of the motor with respect to the frame of the vehicle.

9. In a device of the character described in combination, a motor, a frame for supporting said motor adjustably secured at the axis of the driving-wheel of said vehicle so that the angle of the motor with respect to the frame may be varied, and means slidably adjustable upon the frame of the vehicle for controlling the exhaust-valves of the motor from a point situated near the riding position.

10. In a device of the character described, an internally-threaded tube adapted to be screwed onto the axle of a vehicle, a motor mounted on said tube, and adjustable thereon, and a bracket attached to the frame of said vehicle adapted to secure the motor in position on the said tube by means of bolts coacting with slots concentric with the said axle.

11. In a device of the character described, an internally-threaded tube adapted to be screwed onto the axle of a vehicle, a motor mounted on said tube, and adjustable thereon, a bracket attached to the frame of said vehicle adapted to secure the motor in position on the said tube by means of bolts coacting with slots concentric with the said axle, and a rod attached to the motor for fixing the angle of inclination of the motor.

Signed at New York, N. Y., this 4th day of October, 1900.

WILLIAM W. MORSE.

Witnesses:
ROBT. S. ALLYN,
L. VREELAND.